United States Patent [19]

Takeuchi et al.

[11] Patent Number: 5,528,641
[45] Date of Patent: Jun. 18, 1996

[54] FUEL ASSEMBLY

[75] Inventors: Kenichi Takeuchi, Hitachi; Koji Nishida, Hitachioota; Yasunori Bessho, Mito; Yukihisa Fukasawa; Junjiro Nakajima, both of Hitachi, all of Japan

[73] Assignee: Hitachi, Ltd., Tokyo, Japan

[21] Appl. No.: 357,261

[22] Filed: Dec. 13, 1994

[30] Foreign Application Priority Data

Dec. 27, 1993 [JP] Japan .................................. 5-330998

[51] Int. Cl.$^6$ ................................................. G21C 3/32
[52] U.S. Cl. .................. 376/444; 376/370; 376/210; 376/221; 376/361; 376/443
[58] Field of Search ................................ 376/370, 210, 376/221, 361, 443, 444; 976/DIG. 133, DIG. 201, DIG. 60

[56] References Cited

U.S. PATENT DOCUMENTS

| 4,997,621 | 3/1991 | Johansson et al. | 376/444 |
|---|---|---|---|
| 5,023,047 | 6/1991 | Nishida et al. | 376/370 |
| 5,192,496 | 3/1993 | Soneda et al. | 376/428 |
| 5,202,085 | 4/1993 | Aoyama et al. | 376/435 |
| 5,267,286 | 11/1993 | Hirukawa | 376/353 |

FOREIGN PATENT DOCUMENTS 282600  9/1987  European Pat. Off. .

Primary Examiner—Donald P. Walsh
Assistant Examiner—Meena Chelliah
Attorney, Agent, or Firm—Fay, Sharpe, Beall, Fagan, Minnich & McKee

[57] ABSTRACT

A fuel assembly is provided with a coolant ascending path for making coolant rise and a water rod having a coolant descending path for conducting the coolant.

A ratio of a flow area in a coolant inlet port of the smallest in coolant ascending path 13 on the downstream side than large diameter tube portion 3E to a flow area of the largest in the axial direction of coolant ascending path 13 in large diameter tube portion 3E is set to be 0.2–20%.

In the normal operation, the declination degree from the liquid level in the coolant ascending path, corresponding to the coolant flow rate of the liquid level formed in the coolant ascending path can be controlled. Further, at the time of the excess the change speed of the liquid level can also be controlled.

18 Claims, 11 Drawing Sheets

FUEL ASSEMBLY

BACKGROUND OF THE INVENTION

1. Field of the Invention

This invention relates to a fuel assembly, and more particularly to a fuel assembly suitable for the boiling water reactor.

2. Description of the Prior Art

Uranium 238 contained in the nuclear fuel material changes into plutonium 239 by absorption of the high-speed neutron. With an increase in void fraction in the core, a quantity of high-speed neutron increases. Plutonium 239 causes fission by absorbing thermal neutron. With a decrease in the void fraction in the core, a quantity of the thermal neutron increases, too. Spectral shift operation utilizes the above characteristics. The spectral shift operation has the following features:

(1) At the beginning of the fuel cycle, plutonium 239 is produced by increasing the void fraction in the core.
(2) At the end of the fuel cycle, fission of plutonium 239 is increased by lowering the void fraction. The nuclear fuel material is used efficiently by the spectral shift operation.

EP-A-0282600 shows the fuel assembly with the spectral shift rod which is one example to realize the spectral shift operation.

This spectral shift rod is a water rod which comprises a coolant descending path that leads cooling water rising inside of a coolant ascending path to the lower part of the core. The coolant ascending path has a cooling water inlet port. This cooling water inlet port communicates with the lower part which is located at a portion lower than the fuel supporting portion of the lower tie-plate. The coolant descending path has a cooling water outlet port that communicates with the cooling water passage formed among the fuel rods in the upper part of the fuel supporting portion.

The above water rods have a function of changing a first condition of forming a steam area inside the coolant ascending path (a coolant surface is formed in the coolant ascending path) to a second condition of filling inside of the coolant ascending path with cooling water (a coolant surface is not formed in the ascending path), by setting the resistance value of the fuel supporting portion to the prescribed value, as shown in EP-A-0282600, according to the increase of the cooling water flow rate that is supplied in the fuel assembly.

The spectral shift operation can be achieved by the operation of forming the steam area inside water rods and not forming it inside the water rods. This spectral shift operation can provide a great improvement of a fuel economy. The resistance value at the fuel supporting portion is defined as a rate of the total cross-sectional area of the plural penetrating holes to the cross-sectional area of the cooling water passage formed among the fuel rods.

SUMMARY OF THE INVENTION

An object of this invention is to provide a fuel assembly that can suppress the decrease in the liquid level in the coolant ascending path that corresponds to the flow rate of coolant in the normal state and that can suppress the change speed of the liquid level at the transition period as well.

The feature of this invention resides in setting a ratio of the minimum cross-sectional area B of the coolant ascending path to the maximum cross-sectional area A to be the range of 0.2–20%.

After studying the characteristics of the above water rods in detail, the inventors discovered that the following problem might arise.

The problem is that between the lower part area and the upper part area of the fuel supporting portion, the pressure difference arises by resistance of the fuel supporting portion where there are formed plural penetrating holes of the lower tie-plate. The liquid level that is formed in the coolant ascending path of the water rods are settled by balance with the sum of the above pressure difference and the pressure loss of the static water head and the coolant inlet port that arises with the liquid level in the coolant ascending path.

It was revealed that there is a region where the liquid level in the coolant ascending path abruptly drops, when the ratio (hereinafter referred to as cross-sectional area ratio) of the cross-sectional area of the coolant inlet port to the coolant ascending path is small, even if the above pressure difference is the same.

This is because of the following reason. When the cross-sectional area ratio is sufficiently large, coolant flows in the coolant ascending path from the coolant inlet port to compensate an amount of steam that occurs per unit time in the coolant ascending path of the water rod. At this time, since the coefficient of pressure loss in the coolant inlet port is small, the local pressure loss that occurs by the coolant inlet port is small. Hence, the above static water head balances with the above pressure difference occured by the fuel supporting portion. However, when the cross-sectional area of the coolant inlet port is small, the local pressure loss in the coolant inlet port increases sharply, and the static water head necessary for balance with the above pressure difference decreases. Therefore, the liquid level in the coolant ascending path is formed at the lower part than the level of the liquid level that is formed by the flow rate of cooling water. According to the present invention, the above mentioned problem is solved.

Because the ratio of the crossing area is 0.2% or more, the liquid level formed in the coolant ascending path can suppress the decrease in the liquid level formed corresponding to the coolant flow rate in the normal operation.

In addition, since the ratio of the cross-sectional area is 20% or less, the change speed of the liquid level in the coolant ascending path at the time of the transition period can be suppressed remarkably.

DETAILED DESCRIPTION OF THE PREFERRED EMBODIMENTS

Figure 1:
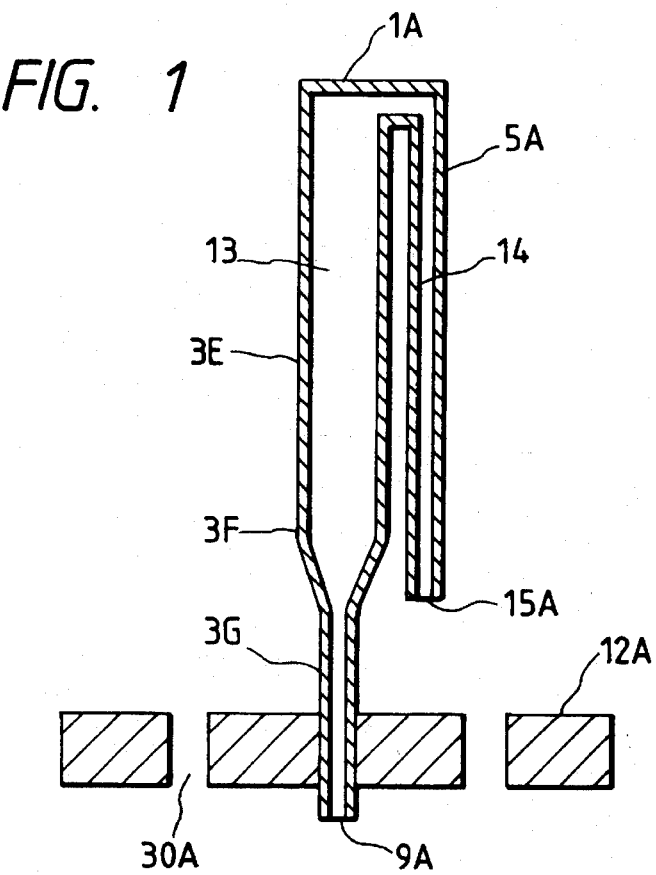
FIG. 1 shows a detailed structure of a water rod employed in a fuel assembly of the present invention.

A fuel assembly of a suitable example of this invention, which is applied to a boiling water reactor, is explained below on the basis of FIG. 1, FIG. 2 and FIG. 3.

Fuel assembly 16A of this example has water rods 1A, fuel rods 17, upper tie-plate 18, lower tie-plate 19A and fuel spacer 20. The upper and lower ends of fuel rods 17 are held by upper tie-plate 18 and lower tie-plate 19. Several fuel spacers 20 are arranged in the axial direction of fuel assembly 16. Fuel spacers 20 maintain the gap between each of abutting fuel rods 17 in the proper state. Fuel spacer 20 is held by water rod 1A. Channel box 21 is disposed to upper tie-plate 18. This channel box 21 surrounds the outer periphery of the bundle of fuel rod 17 held in fuel spacer 20. Lower tie-plate 19A has fuel supporting portion 12A to the end part. Space 22 is formed inside of lower part of fuel supporting portion 12A. Fuel supporting portion 12A supports the lower ends of fuel rod 17 and water rod 1A. Coolant path 23 is formed above the lower tie plate 19A. That is, the position is above fuel supporting portion 12A, but at the position between fuel rods 17 and outside of water rod 1A.

Water rod 1A is provided with ascending tube 3E and descending tube 5A. Water rod 1 that is formed by these parts are made of zirconium alloy. Coolant ascending path 13 that leads coolant to the upper part is formed in ascending tube 3A. Coolant descending path 14 that leads coolant, which is lead by coolant ascending path 13, to the lower part is formed inside of descending tube 5A. Ascending tube 3 has a smaller diameter tube 3G and a larger diameter tube 3F, the outer diameter of the former being smaller than that of the latter.

Smaller diameter tube 3G is positioned in the lower part of large diameter tube 3F, and is connected to large diameter tube 3F through a tapered portion. As a matter of course, the cross-sectional area of coolant ascending path 13 in smaller diameter tube 3G is smaller than that of coolant ascending path 13 in large diameter tube 3F. The cross-sectional area of coolant ascending path 13 in large diameter tube 3F is 429.0 mm$^2$, and the cross-sectional area of coolant inlet port 9A is 19.6 mm$^2$. The cross-sectional area of the latter is 4.6% of the former.

The cross-sectional area of coolant ascending path 13 in smaller diameter tube portion 3G is also equal to coolant inlet port 9A, and is 19.6 mm$^2$. In coolant ascending path 13, 19.6 mm$^2$ is the figure of the smallest cross-sectional area between the interval of the large diameter tube portion 3F and coolant inlet port 9A.

Coolant inlet port 9A of coolant ascending path 13 is formed at the lower end of coolant ascending path 13 (lower end of smaller diameter tube portion 3G) and it communicates space 22 below fuel supporting portion 12A. Coolant outlet port 15A of coolant descending path 14 opens to coolant path 23 that is formed at the upper part out of fuel supporting portion 12A.

Figure 3:
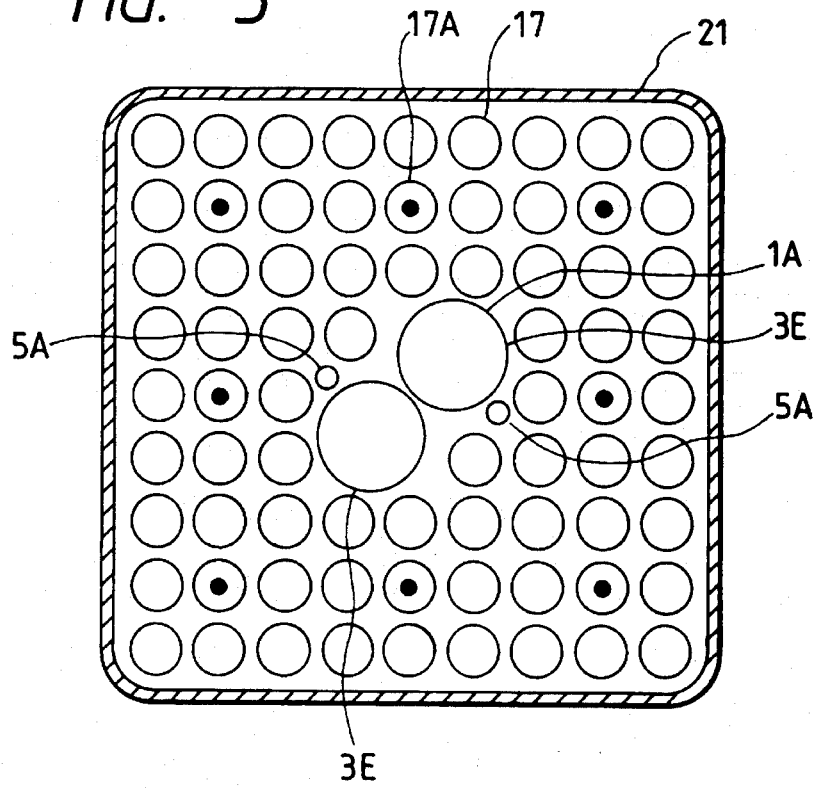
FIG. 3 is a transverse sectional view of the fuel assembly of FIG. 2.

As shown in FIG. 3, among fuel rods arrangement in fuel assembly 16A, part length fuel rods 17A of which axial length is shorter than fuel rods 17 are set up in the second layer from the outermost layer. There are 66 fuel rods 17 and 8 part length fuel rods 17A. These fuel rods are arranged in 9 lines×9 rows.

Two water rods 1A are set up in the center of the cross section on diagonal in the cross section of fuel assembly 16A (FIG. 3). That is, each ascending tube 3E (especially, large diameter tube portion 3F) of two water rods 1A is aligned to adjoin each other on the above diagonal line. Each of descending tubes 5A of each of water rods 1A is positioned between fuel rods 17 that adjoins tube portion 3F of a large diameter. These descending tubes 5A are positioned in the reverse directions each other at positions where a diagonal line at which the large diameter tube 3F is located crosses perpendicularly with a diagonal line. By the arrangement of the water rods, an outer diameter of each of the large diameter tube can be made large to the extent that seven fuel rods 17 are placed. As a result, the cross-sectional area of coolant ascending path 13 in each large diameter tube portion 3F can be enlarged.

A vertical sectional view of each water rod 1A is in the form of opposite letter U. Descending tube 5A is supported by the large diameter tube portion 3F of ascending tube 3E by a supporting member (not shown) in plural places along the axial direction thereof. A small gap is formed between descending tube 5A and the large diameter tube portion 3F.

Figure 4A:
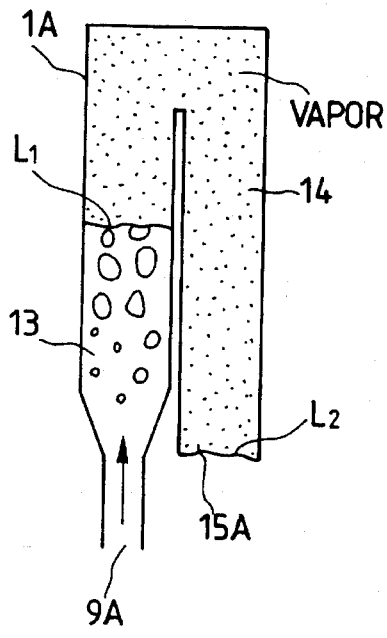
FIGS. 4A, 4B, and 4C are characteristic diagrams showing the flow state in the water rod of FIG. 1.
Figure 4B:
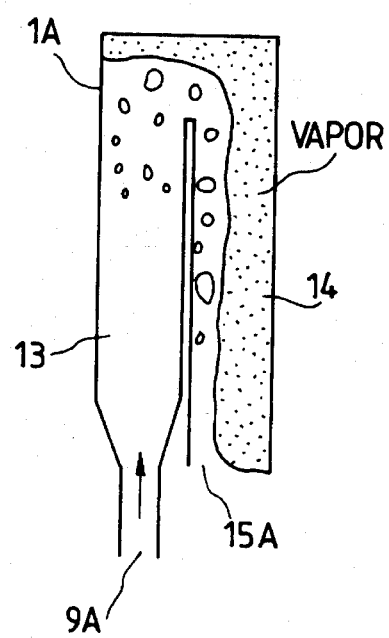
Figure 4C:
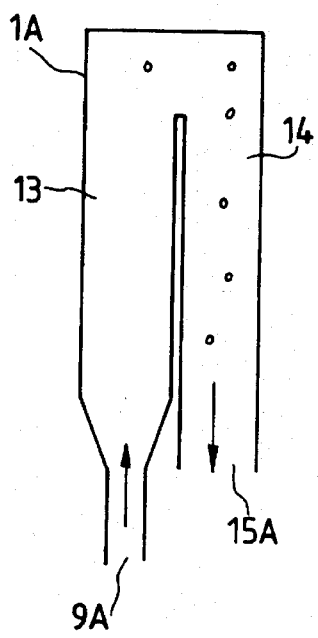

When an amount of cooling water to be supplied to a fuel assembly provided with water rod 1A having coolant ascending path 13 and coolant descending path 14 therein is changed, flowing condition of the fluid in the water rod 1A changes as shown in FIGS. 4A, 4B and 4C.

Fuel assembly 16A is loaded into the core of the boiling water reactor. The cooling water flow rate supplied to the core is controlled by adjusting the rotation speed of the recirculation pump. The cooling water is first introduced into space 22 of lower tie-plate 19A. Most of this cooling water passes though plural penetrating holes 30A provided in fuel supporting portion 12A into the coolant path 23 formed in the upper part than the top surface of fuel supporting portion 12A. The cooling water cools fuel rods 17 and 17A. The remaining part of cooling water is introduced into coolant ascending path 13 formed in the smaller diameter tube portion 3G of water rod 1A through coolant inlet port 9A. This cooling water rises inside of coolant ascending path 13 formed in the large diameter tube portion 3F of water rod 1A.

When a quantity of cooling water supplied to fuel assembly 16A is not large, the cooling water that exists in coolant ascending path 13, especially in large diameter tube portion 3A is heated by irradiation of the gamma rays that occur in the fission, and turns into steam. As shown in FIG. 4A, the steam area is formed in coolant ascending path 13. Therefore, the liquid level is formed in coolant ascending path 13.

The generated steam is discharged in coolant path 23 from coolant outlet port 15A via coolant descending path 14. When the cooling water flow rate increases, the liquid level in coolant ascending path 13 rises, and the steam area decreases. The condition shown in FIG. 4B occurs later. At last, it reaches the condition shown in FIG. 4C. Coolant ascending path 13 and coolant descending path 14 reach the condition filled with cooling water. Through the change between the beginning and the end of the fuel cycle, the spectral shift effect is improved, as the change width of the void fraction in fuel assembly 16A is enlarged. Therefore, the fuel cycle period is greatly extended. It is near the end of the fuel cycle that all of the coolant ascending paths 13 and coolant descending paths 14 are filled with cooling water. Most of the time of the fuel cycle the steam area is formed in coolant ascending path 13. As shown in FIG. 7A of EP-A-0282600, if the coolant descending path of the water rod is set to surround the coolant ascending path, as the tube wall which is set between the coolant ascending path and coolant descending path touches steam, cooling of the pipe wall becomes insufficient. As a result, the tube wall temperature becomes high.

In this example, ascending tube 3E and descending tube 5A are arranged so as to form the opposite letter U, and as mentioned above, the gap exists between ascending tube 3E and descending tube 5A. Therefore, all circumference of the ascending tube 3E and descending tube 5A are cooled by the cooling water that rises in cooling water passage 23. Thus, the temperature of ascending tube 3A and descending tube 5A becomes lower. The problem that occurs in the water rod shown to FIG. 7A of EP-A-0282600 is dissolved.

As mentioned above, the liquid level in the water rod 1A filled with water shifts to empty by adjusting the cooling water flow rate that is supplied in fuel assembly 16A. The reason is the total cross-sectional of all the penetrating holes 30A provided in fuel supporting portion 12A is set to enable the shift of the liquid level. That is, the total cross-sectional area of all the penetrating holes 30A are set corresponding to the static water head that corresponds to the difference of the level of the upper end of coolant ascending path 13 and the level of coolant outlet port 15A. The total cross-sectional area of all the penetrating holes 30A provided in fuel supporting portion 12A is smaller than the cross-sectional area of cooling water passage 23. Fuel supporting portion 12A of this structure becomes the resistance to the cooling water that is directed to cooling water passage 23.

Figure 5:
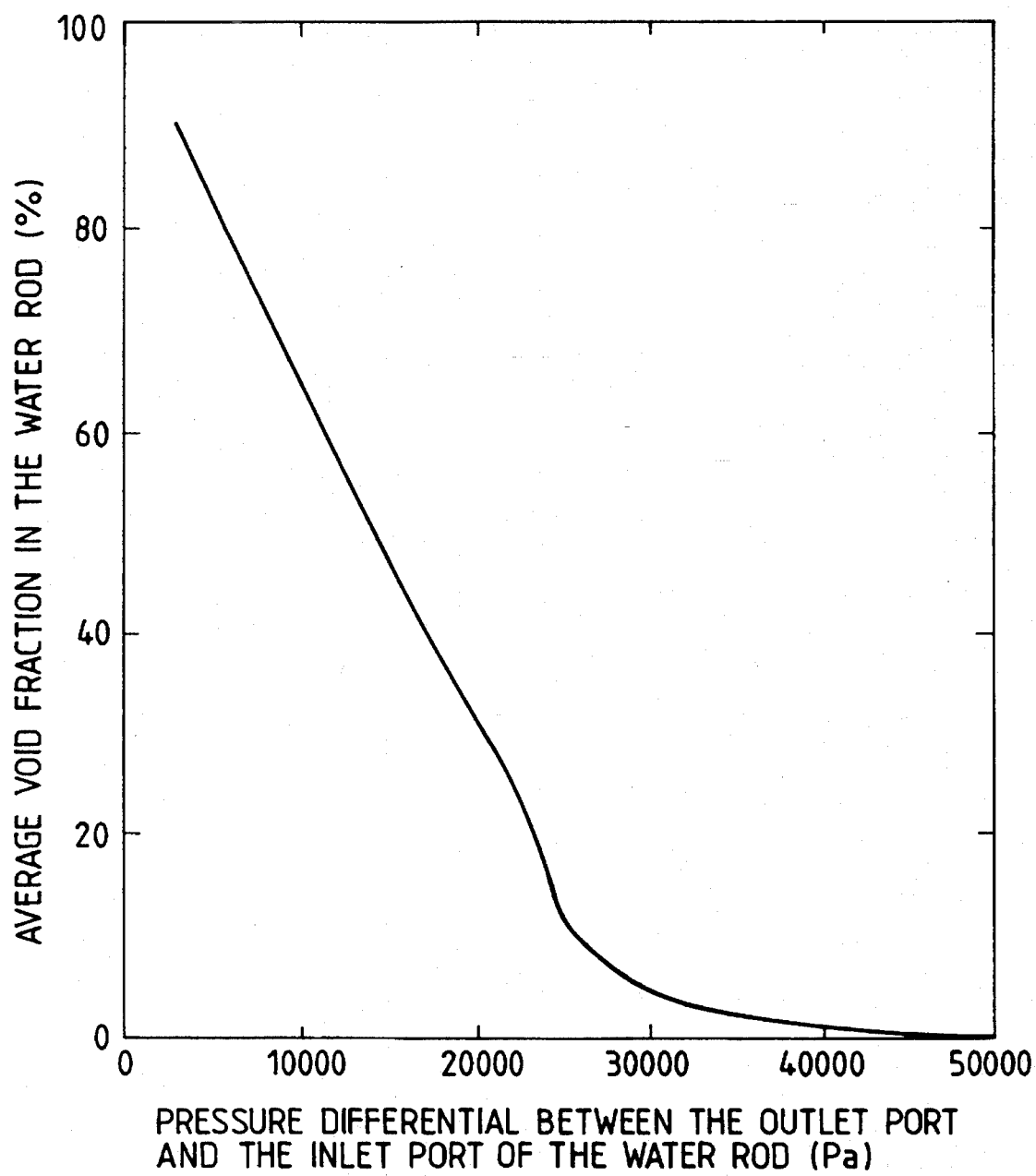
FIG. 5 is characteristic diagram showing the relationship between the average void fraction in the water rod and the pressure differential between the outlet port and the inlet port of the water rod.

In descending tube 5A of each water rod 1A, the cross-sectional area of coolant descending path 14 is smaller than 1/25 of that of coolant ascending path 13 in ascending tube 3E (large diameter tube portion 3F part). In this example, the cross-sectional area of coolant descending path 14 is 2.7 mm$^2$. Fuel assembly 16A has characteristics shown by the solid line in FIG. 5. Average void fraction in the water rod 1A is a single-valued function of the pressure differential between the outlet port and the inlet port of the water rod 1A, i.e., it changes monotonically and smoothly with the pressure differential. Therefore, a boiling water reactor core loaded with fuel assembly 16A can be operated by controlling the cooling water flow rate supplied to the core as shown in FIG. 6.

Figure 6:
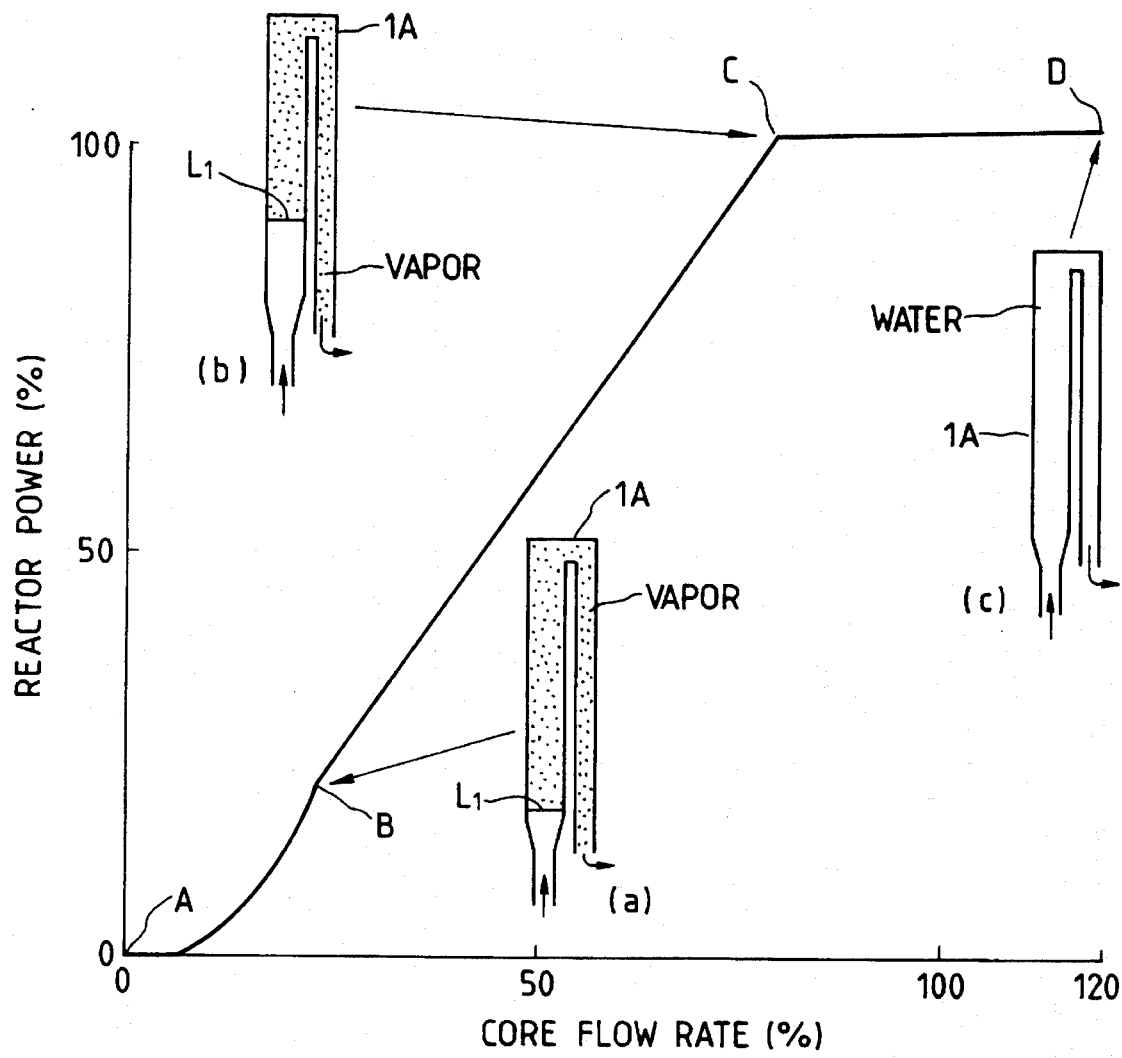
FIG. 6 is explanatory diagram showing operating method of a reactor loading the fuel assembly of FIG. 2.

Now, we will describe an operation method of the reactor based on FIG. 6. At the startup of the reactor in a fuel cycle, the reactor power is raised from point A to point B. With the core flow rate (flow rate of the cooling water supplying into the core) kept at 20% by the revolution speed regulation of the circulation pump, the control rods are fully withdrawn to increase the reactor power from point A to point B. At point B all the control rods have been withdrawn completely from the core. At point B the state inside the water rods is as shown at (a) of FIG. 6. In this state, the major part of the coolant ascending path 13 and the coolant descending path 14 is filled with vapor. A liquid surface L1 is formed at a certain level in the lower part of the ascending path 13. After the reactor power was increased to value of point B, the core flow rate is gradually increased by increasing the revolution speed of circulation pump, without operating the control rods. This operation results in the water surface L1 in the coolant ascending path 13 where the coolant rises slowly. Hence, the reactor power increases from point B to a specified reactor power, at point C, which is the rated power (say, 100% reactor power). Rising the reactor power is performed at a specified rate of increase to avoid fuel damages. At point C the state in the water rod 1A is shown at (b) of FIG. 6. The water surface L1 in the coolant ascending path 13 is higher than that for point B. After point C until the end (point D) of the fuel cycle, reactor power is maintained at the rated power by increasing the core flow rate due to compensate the reduction of reactivity. At point D, the water rod 1A is completely filled with the cooling water, as shown at (c) of FIG. 6.

As mentioned above, because each descending tube 5A is set between a pair of fuel rods 17 that adjoin corresponding large diameter tube portion 3F, the cross-sectional area of coolant ascending path 13 in large diameter tube portion 3F increases. Therefore, when the steam area is formed in large diameter tube portion 3F, the generation quantity of plutonium increases. When coolant ascending path 13 and coolant descending path 14 are filled with cooling water (moderator) near the end of the fuel cycle, it activates the fission of the fissile material, such as plutonium. As a result, because the reactivity in the central part in the cross section of fuel assembly 16A is improved more, effective use of nuclear fuel is expected. This can further improve the fuel economy of the spectral shift operation. Descending tube 5A is positioned in the reverse direction to each other in the direction of other diagonals that are orthogonal with the diagonal in which ascending tube 3E is positioned. Even if both descending tubes 5A are filled with steam, the steam area does not concentrate in a limited position of the cross section of fuel assembly 16A. In other words, the steam areas are dispersed in a good balance in the cross-section. This prevents the non-uniform burning of the nuclear fuel in the cross section of the fuel assembly.

The inventors conducted the following experiment.

In this experiment, a cross-sectional area ratio of the coolant inlet 9A to a cross sectional area of the portion having the largest sectional area of the coolant ascending path 13 was variously changed. Then, changes of the normal liquid level in coolant ascending path 13 (liquid level in the coolant ascending path formed according to an amount of coolant flow rate) were observed.

The cross sectional area in coolant entrance 9A represents the smallest cross-sectional among the coolant ascending path 13 between the coolant inlet port 9A and large diameter tube portion 3F (part of the coolant ascending path in smaller diameter tube portion 3G).

Figure 7:
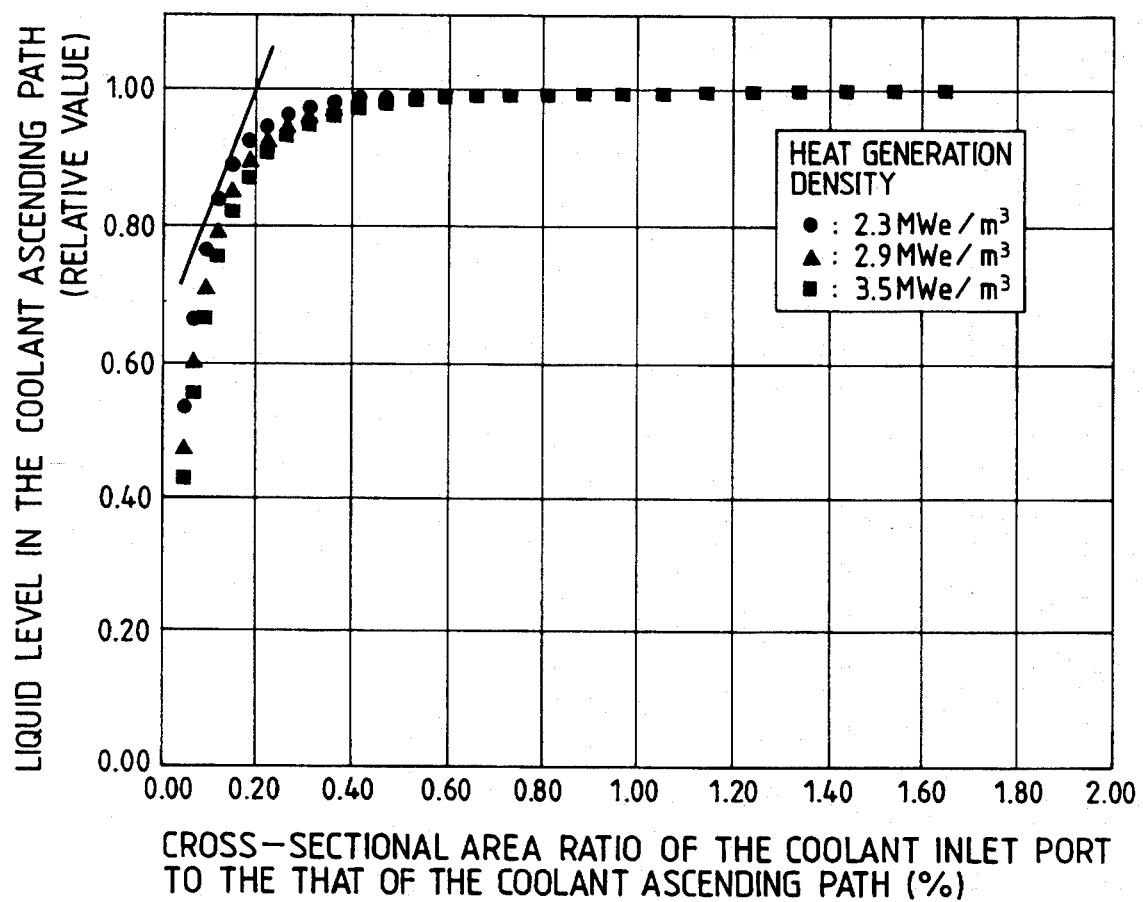
FIG. 7 shows relationship between the ratio of the flow area of the coolant inlet port to the flow area of the coolant ascending path and the liquid level in the coolant ascending path.

FIG. 7 shows the relation with the normal liquid level and the cross-sectional area ratio of the coolant inlet portion to the that of the coolant ascending path. From these relations, the heat generation densities in the coolant ascending path are 2.3 MW/m$^3$, 2.9 MW/m$^3$ and 3.5 MW/m$^3$, respectively.

The vertical axis of FIG. 7 shows liquid level (relative value) in the coolant ascending path by the ratio of the liquid level that is actually formed in the coolant ascending path to the liquid level (normal liquid level) in the coolant ascending path that is formed corresponding to the coolant flow rate in the normal operation. When the liquid level of the former and the latter are equal in FIG. 7, the relative value of the liquid level becomes 1.0. When the liquid level of the latter is lower than the liquid level of the former in FIG. 7, the relative value of the liquid level becomes smaller than 1.0. In the normal operation, when the relative value of this liquid level becomes less than 1.0, the liquid level formed in coolant ascending path 13 becomes lower than the liquid level in coolant ascending path 13 formed corresponding to the coolant flow rate.

The inventors discovered such a phenomenon that when the ratio of the cross-sectional area of the coolant inlet port of the coolant ascending path to the cross-sectional area of the coolant ascending path is smaller than 0.2%, the above declination rate of the liquid level in the coolant ascending path increases rapidly. When the cross-sectional area of coolant inlet port 9A becomes too small, there is observed such a phenomenon as forming a lower liquid level during normal operation in coolant ascending path 13. As a result, the local pressure loss in coolant inlet port 9A increases rapidly. Therefore, the static water head lowers, which is necessary to balance with the pressure difference that occurs between the lower part area and the upper part area of fuel supporting portion 12A by function of the supporting portion 9A (static water head that occurs on the liquid level in the coolant ascending path). Accordingly, the lowering of the liquid level in the coolant ascending path becomes remarkable.

The above phenomenon also can be explained by the following. In the area where the cross-sectional area ratio is small, especially smaller than 0.2%, the larger the heat generation density, the larger the degree of lowering of liquid level, even if the cross-sectional area ratio is equal. That is, when the heat generation density is 2.3 MW/m$^3$, the declination rate of the liquid level is smaller than the case where the heat generation density is 3.5 MW/m$^3$. The reason for the above phenomenon is explained as follows. In case of low heat generation density where a rate of steam generation in the unit time in coolant ascending path 13 is small, an amount of coolant that flows into coolant ascending path 13 from coolant inlet port 9A flow in coolant ascending path 13 is not large. Hence, the pressure loss in coolant inlet port 9A becomes relatively small, and the static water head in coolant ascending path 13 becomes relatively high. This static water head balances substantially with the pressure loss that arises in fuel supporting portion 12.

The declination rate of the above liquid level is controlled remarkably by increasing the cross-sectional area ratio to 0.2% or more. Particularly, the declination rate of the above liquid level becomes the smallest by increasing the cross-sectional area ratio to 0.4% or more.

Figure 13:
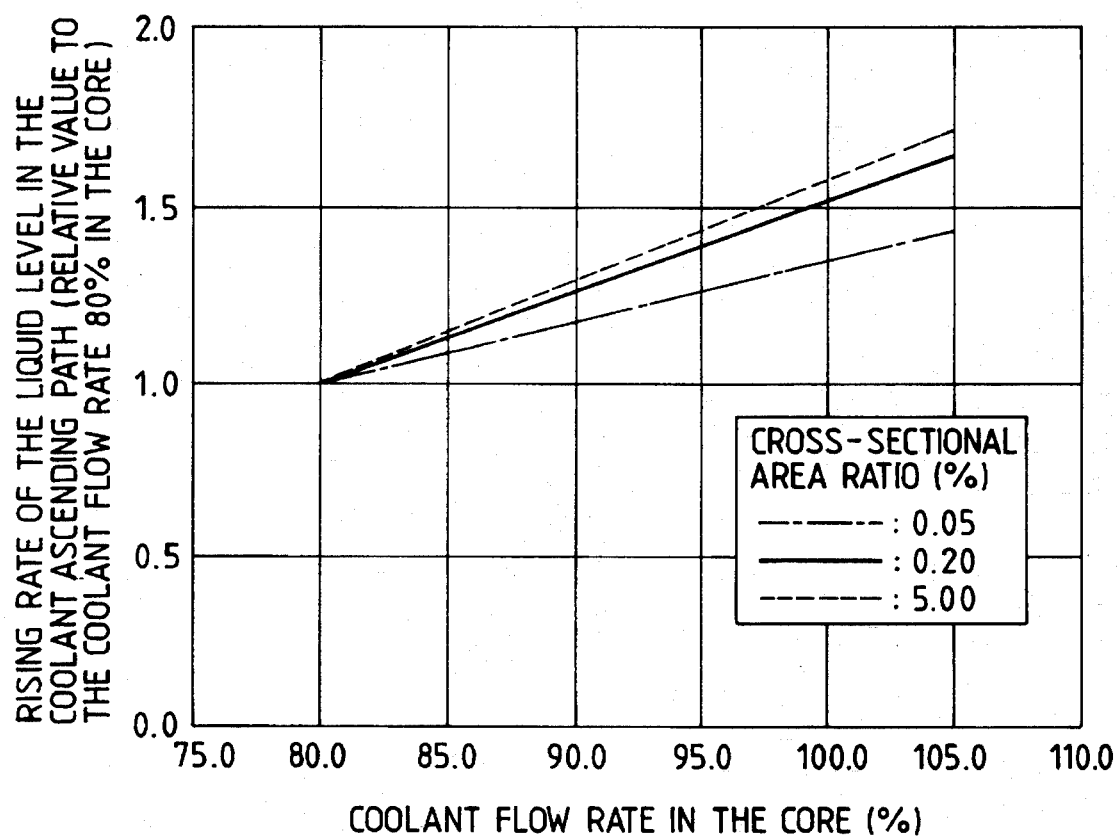
FIG. 13 is a graph showing relationship between the coolant flow rate and the rising rate of the liquid level in the coolant ascending path.

FIG. 13 shows the ascending rate of the liquid level which is formed coolant ascending path 13 when the coolant flow rate in the core is increased to 80–105%. Such ascending rate is observed when the cross-sectional area ratios are 0.05%, 0.20% and 5.00%, respectively. Every ascending rate was determined based on the liquid level occurring at the core flow rate of 80%.

The pressure difference that occurs due to fuel supporting portion 12A changes in proportion to the square of the core flow rate. The liquid level in coolant ascending path 13 is presumed to be determined substantially by the balance of static water head in the pressure difference and coolant ascending path 13. Because the liquid level changes in proportion to the change of the above pressure difference, a pressure difference of the case where the coolant flow rate in the core is 105% becomes about 1.72 times the pressure difference of the case where the coolant flow rate is 80%. In the case where the core flow rate is 105%, the liquid level in coolant ascending path 13 becomes about 1.72 times the liquid level of the case where the core flow rate is 80%.

In case of the cross-sectional area ratio of 0.05% and the coolant flow rate in the core of 105%, the liquid level in coolant ascending path 13 is about 1.44 times that of the case where the core flow rate is 80%, as shown in FIG. 13. When the cross-sectional area ratio is 0.20%, the liquid level of the former becomes about 1.65 times that of the latter. When the cross-sectional area ratio is 5.00%, the liquid level of the former becomes about 1.72 times that of the latter.

When the cross-sectional area ratio is 0.20% or more, the changing rate of the liquid level in coolant ascending path 13 becomes a proper value. On the other hand, when the cross-sectional area ratio is smaller than 0.20%, the pressure loss of coolant inlet port 9A influences much on the liquid level in coolant ascending path 13. That is, the liquid level changing rate becomes smaller than the pressure difference occured by fuel supporting portion 12A. Even if the pressure difference increases in proportion to an increase of the coolant flow rate in the core, the void fraction is not decreased sufficiently, when an increase rate of the liquid level is small. Because neutron is not decelerated sufficiently in the above case, fission product such as plutonium 239 is suppressed. Therefore, the effect of the spectral shift operation is not obtained sufficiently. When the cross-sectional area ratio is 0.2% or more, the liquid level that is formed in coolant ascending path 13 is controlled substantially by balance with the pressure difference that is occured by fuel supporting portion 12A and the static water head that is occured by its liquid level. Therefore, the change of the liquid level can be secured sufficiently so that a favorable spectral shift operation can be carried out.

Figure 14:
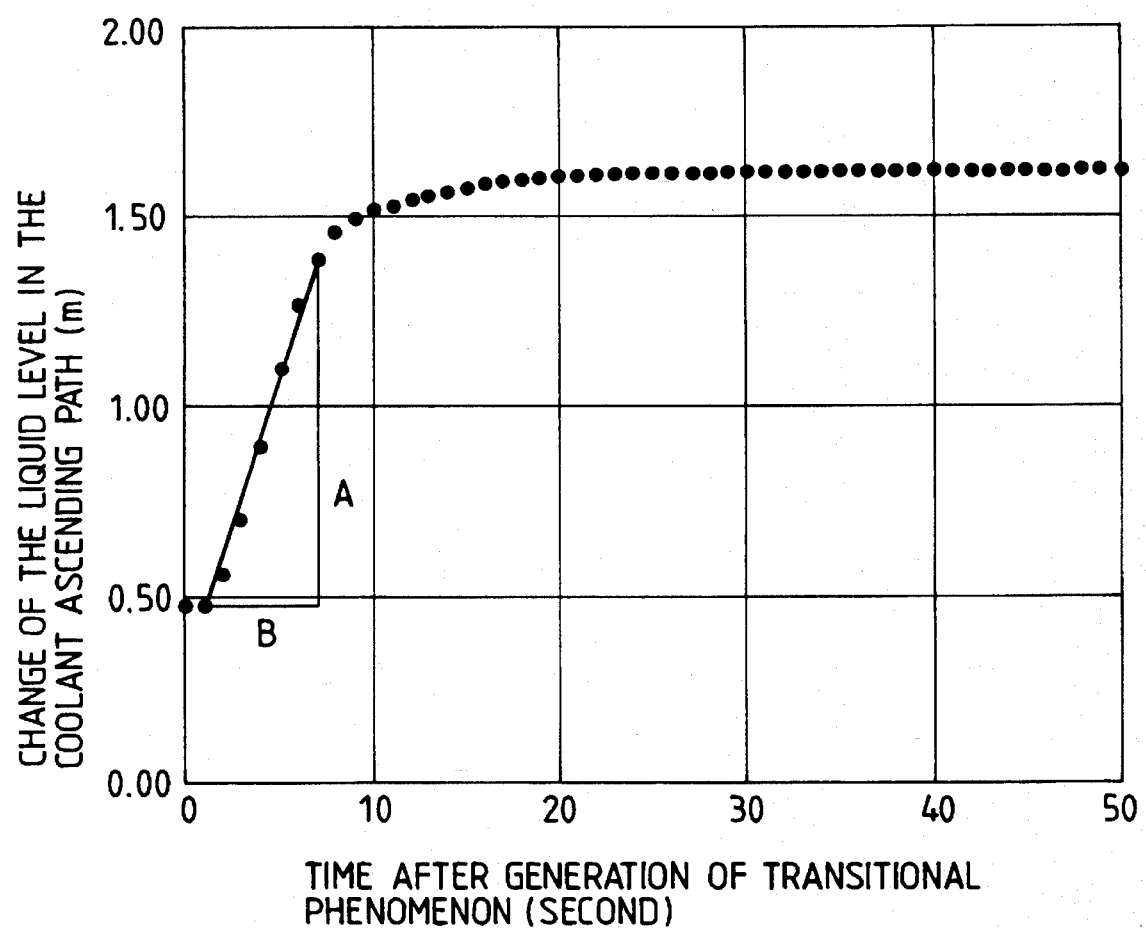
FIG. 14 is a graph showing the change of the liquid level in the coolant ascending path with respect to time after generation transient phenomenon.

The inventors examined the change of the liquid level in coolant ascending path 13 of water rod 1A, when transitional phenomena such as an emergent rise of the nuclear reactor pressure and rapid increase of the coolant flow rate in the core occur. A change speed of the liquid level is defined as a change rate of the liquid level per time from the beginning of increase of the liquid level to the ending of the liquid level, which increase of the liquid level is caused by an increase of the pressure difference that is occured by fuel supporting portion 12A. FIG. 14 shows the change of the liquid level against the time after generation of transitional phenomenon in the case where the cross-sectional area ratio is about 73%. For example, the change speed of the liquid level shown in FIG. 14 is expressed by the following formula.

Liquid level change speed $= A/B \approx 0.17$

The change speeds of the liquid level are calculated for various cross-sectional area ratios. The change speed of the liquid level determined in this way are shown by the characteristics in FIG. 8. The horizontal axis of FIG. 8 indicates the cross-sectional area ratio. This characteristics show that the cross-sectional ratio should be 20% or less, in order to suppress the change speed of the liquid level when the transitional phenomenon occurs. If the cross-sectional area ratio is 12% or less, the change speed of the liquid level at the time of transitional phenomenon can be suppressed more effectively.

According to the above examination results, the cross-sectional area ratio needs to be kept in the range of 0.2–20%, and preferably, the range of 0.4–12%.

Figure 8:
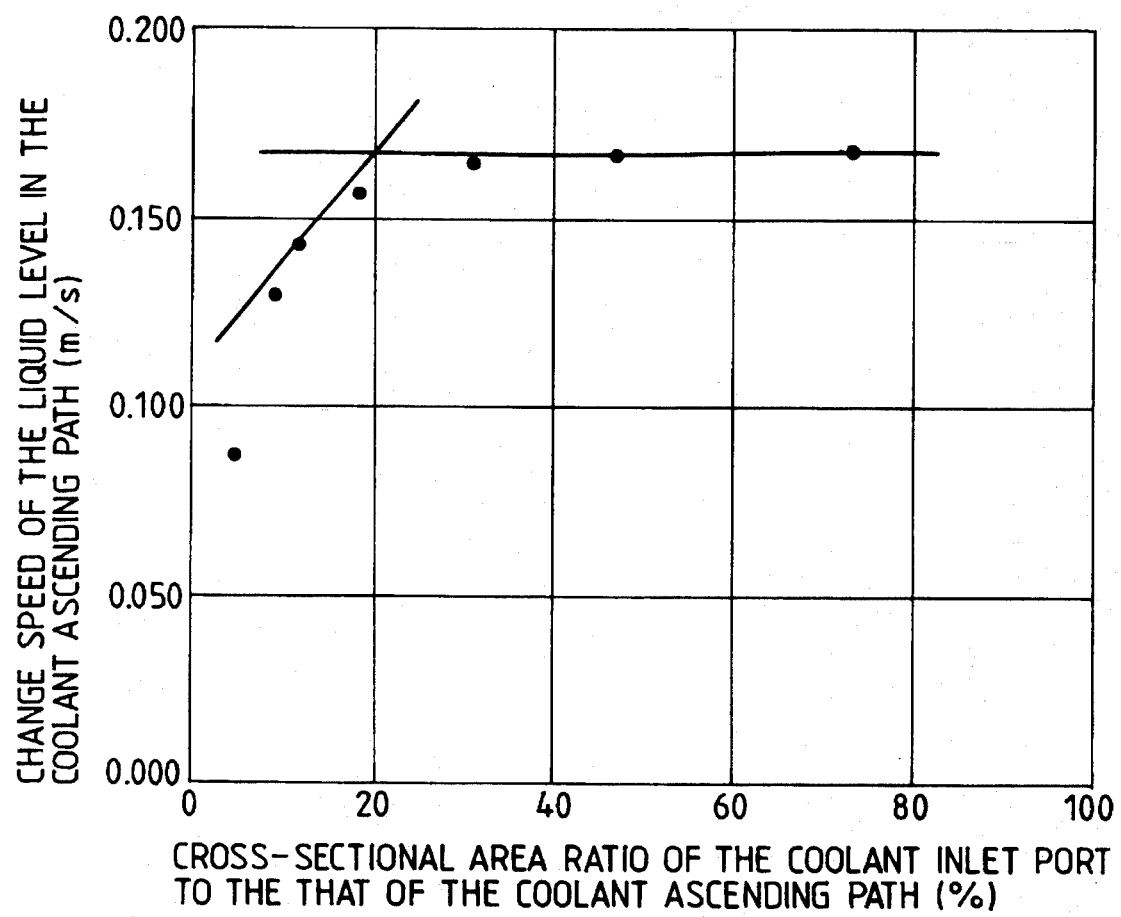
FIG. 8 shows relationship between the ratio of the flow area of the coolant inlet port to the flow area of the coolant ascending path and the liquid level change speed in the coolant ascending path during transient phenomenon.
Figure 9:
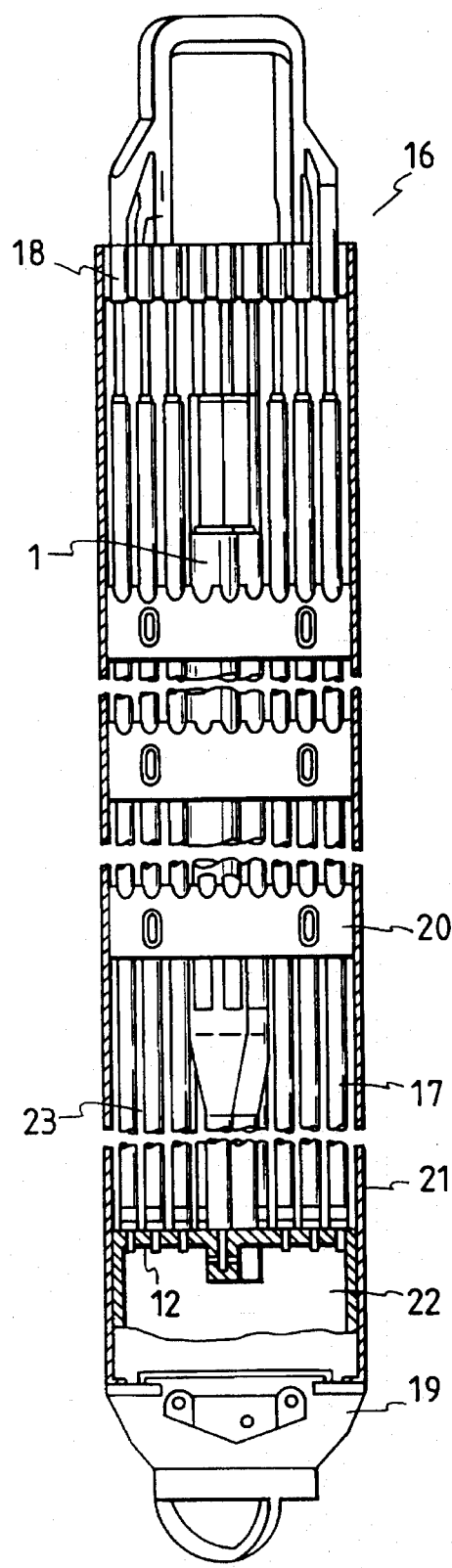
FIG. 9 is a longitudinal sectional view of the fuel assembly of another examples of this invention.

The pressure loss corresponding to cross-sectional area ratio of 20% or less can also be obtained by another structure shown in FIG. 8, for example. This can be realized by setting a pressure difference between lower middle end plug e and the lower end d of the lower end plug to be a value corresponding to the pressure loss at the time of 20% or less of cross-sectional area ratio. The effect obtained by such the structure is the same as that obtained by the above mentioned example.

Figure 2:
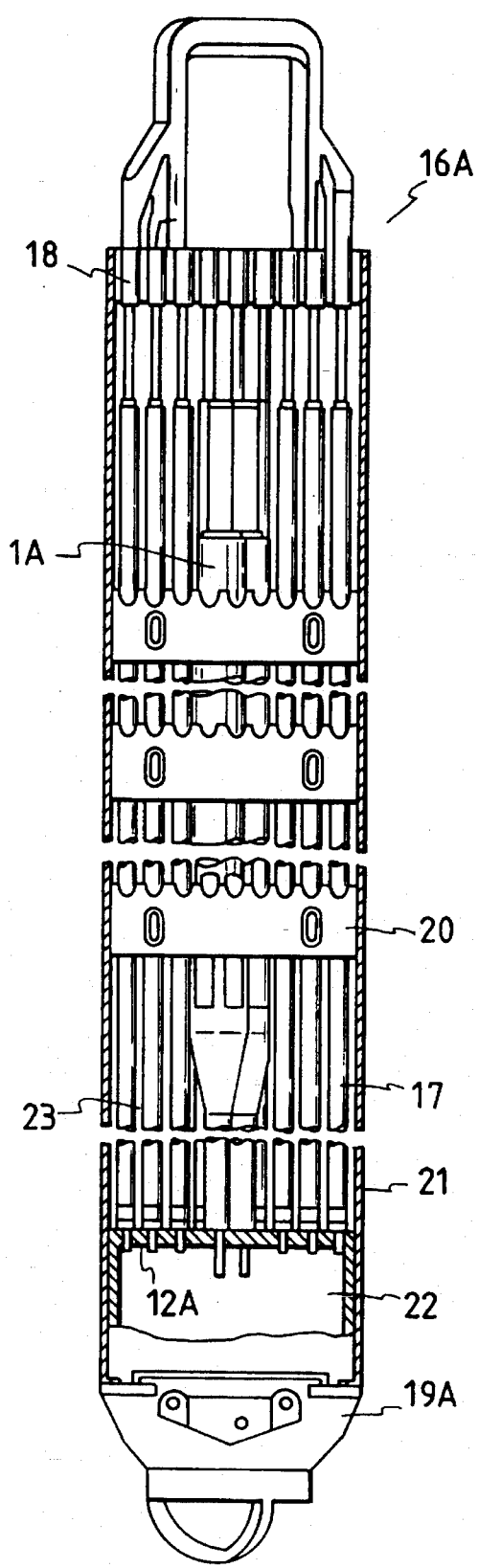
FIG. 2 is a longitudinal sectional view of the fuel assembly of this invention.

In an example shown in FIG. 2, the cross-sectional area ratio of the coolant inlet port to the cross-sectional of the coolant ascending path is 0.2% or more. In a normal operation, a declination rate of the liquid level formed in the coolant ascending path can be controlled. In addition, since the cross-sectional area ratio of the coolant inlet port to the cross-sectional of the coolant ascending path is 20% or less, the change speed of the liquid level in the coolant ascending path at the time of the transition is suppressed.

The fuel assembly that is applied to a boiling water reactor of the example of this invention is explained on the basis of FIG. 9–FIG. 12. Fuel assembly 16 of this example comprises water rod 1, fuel rod 17, upper tie-plate 18, lower tie-plate 19 and fuel spacer 20. The upper and lower ends of fuel rod 17 are held by upper tie-plate 18 and lower tie-plate 19. Plural fuel spacers 20 are arranged in the axial direction of fuel assembly 16, and they maintain proper gaps between adjacent fuel rods 17. Fuel spacers 20 are held in water rod 1. Channel box 21 surrounds the outer periphery of the bundle of fuel rod 17 held by fuel spacers 20 installed in upper tie-plate 18. Lower tie-plate 19 has fuel rod supporting portion 12 at the upper end, and it has space 22 in the lower part of fuel rod supporting portion 12. Fuel rod supporting portion 12 supports the lower end of fuel rod 17 and water rod 1.

Water rod 1 has lower end plug 2, ascending tube 3, coupling portion 4, descending tube 5 and upper end plug 6. Water rod 1 composed of these parts is made of the zirconium alloy.

Figure 11:
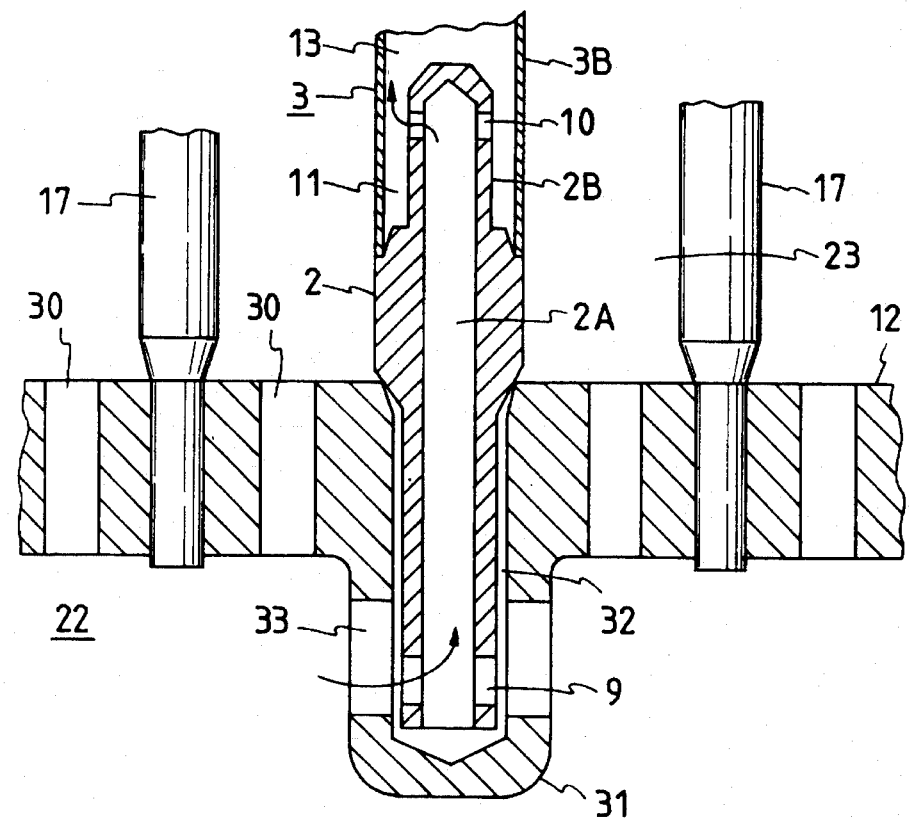
FIG. 11 is a longitudinal sectional view of the lower end where a plug is inserted into the water rod at the lower fuel supporting portion shown in FIG. 9.

Ascending tube 3 has smaller diameter tube portion 3B and taper part 3C an outside diameter of which is smaller than large diameter tube portion 3A and large diameter tube portion 3A. Taper part 3C has penetrating hole 7 therein, and it forms taper portion at the outside thereof. The lower end of large diameter tube portion 3A is welded and is joined to the upper end of taper part 3C. The upper end of smaller diameter tube portion 3B is welded and is joined to the lower end of taper part 3C. The lower end of smaller diameter tube portion 3B is joined by welding to lower end plug 2. The upper end of large diameter tube portion 3A is welded to coupling portion 4. Descending tube 5 is arranged parallel with ascending tube 3. The upper end of descending tube 5 is welded and is joined to coupling portion 4. Upper end plug 6 is installed in the upper end of coupling portion Lower end plug 2 shown in FIG. 11 is held in fuel supporting portion 12 by water rod 1. In lower end plug 2, passage 2A is formed therein, and coolant inlet port 9 is provided at the lower end of lower end plug 2. Coolant inlet port 9 is provided at the side wall of lower end plug 2 and communicates with passage 2A. Lower end plug 2 has projected portion 2B where the upper end is sealed at the upper end part. Opening 10 is provided sideways in the side wall of projected portion 2B. Projected portion 2B is arranged in a concentric relation with smaller diameter tube portion 3B therein. Projected portion 2B is located at a position higher than the welded portions of smaller diameter tube portion 3B and lower end plug 2. For that reason, a circular clad reservoir 11 is formed between smaller diameter tube portion 3B and lower end plug 2. This clad reservoir 11 is positioned at a lower point part than opening 10.

Lower end plug 2 is inserted into hole 32 formed in boss 31 provided on the underneath of fuel supporting portion 12 of lower tie-plate 19. The lower end of hole 32 is sealed. Opening 33 extended to hole 32 is provided in the side wall of boss 31. The outer diameter of lower end plug 2 is substantially the same as the inner diameter of hole 32. The lower end of passage 2A that extends in the axial direction of lower end plug 2 is closed in the bottom portion of boss 31. The increase of the burning of the fuel assembly accelerates crystal growth (irradiation growth) of materials of water rod 1 due to irradiation. Therefore, it is desirable that the size of opening 33 should be larger than the original size so as to assure a sufficient margin for the upper part side from coolant inlet port 9 of lower end plug 2. In addition, there is a possibility that the location of lower end plug 2 and fuel supporting portion 12 might change from that of manufacturing time, because of burning of nuclear fuel, etc. It is desirable that the structure of opening 33 has large margin at a lower position of coolant inlet port 9.

Coolant ascending path 13 is formed in lower end plug 2 and ascending tube 3. Coolant ascending path 13 is constituted by passage 2A, opening 10, space in smaller diameter tube portion 3B, a penetrating hole and space in large diameter tube portion 3A. Coolant inlet port 9 is located at the lower part than fuel supporting portion 12 and communicates with space 22. Coolant ascending path 13 at large diameter tube portion 3A has the largest diameter. The cross-sectional area of that part is 429.0 mm$^2$. Passage 2A is formed in lower end line 2 of ascending tube 3 (a part of coolant ascending path 13) has the smallest cross-sectional area in coolant ascending path 13 (downstream side of large diameter tube portion 3A). The cross-sectional area of passage 2A is 19.6 mm$^2$, and it is smaller than the total cross-sectional area of the whole coolant inlet ports 9. The ratio of the cross-sectional area of passage 2A to the cross-sectional area of coolant ascending path 13 in large diameter tube portion 3A is about 4.6%.

The lower end of descending tube 5 is sealed. Coolant outlet port 15 is provided in the side wall of the lower end of descending tube 5. Coolant outlet port 15 is positioned at a higher part than fuel supporting portion 12. Coolant descending path 14 is formed in descending tube 5. Coolant outlet port 15 communicates with coolant descending path 14 and is communicated to coolant path 23 that is formed between fuel rods 17 in the upper part from fuel supporting portion 12.

Figure 12:
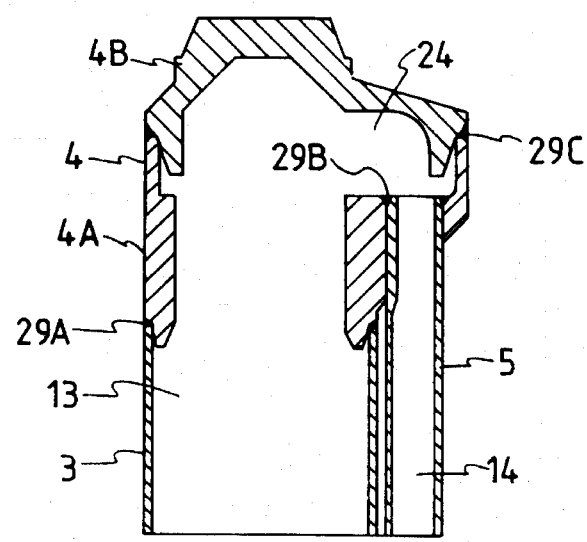
FIG. 12 is an expansion figure of the connecting portion of the water rod shown in FIG. 9.

As shown in FIG. 12, coupling portion 4 has the lower part 4A of the coupling portion and the upper part 4B of the coupling portion. The lower part 4A of the coupling portion and the upper part 4B of the coupling portion are welded and joined. Large diameter tube portion 3A and descending tube 5 are welded to the lower part 4A of the coupling portion. Passage 24 formed in coupling portion 4 communicates between coolant ascending path 13 and coolant descending path 14. Therefore, water rod 1 is in the form of the opposite letter U shown in FIG. 10.

The lower part 4A of the coupling portion and ascending tube 3 are joined by weld 29A. The lower part 4A of the coupling portion and descending tube 5 are joined by weld 29B. The lower part 4A and the upper part 4B of the coupling portion are joined by weld 29C.

In this example, in order to obtain the water rod, an outline of an assembling process of ascending tube 3, coupling portion 4 and descending tube 5 is explained below.

First of all, the upper end of large diameter tube portion 3A is welded and installed at the lower end of coupling portion lower part 4A (weld 29A). Then, the upper end of descending tube 5 is inserted in the penetrating hole provided in the lower part 4A of the coupling portion. The upper end of the entire periphery of the descending tube 5 is welded and joined (weld 29B) to the side wall that surrounds the penetrating hole of the lower part 4A of the coupling portion. The lower part 4A of the coupling portion is a connecting member for connecting ascending tube 3 to descending tube 5. At last, the upper part 4B of the coupling portion is installed so as to cover the coolant descending path 14 on the lower part 4A of the coupling portion of penetrating hole 4E in the descending path 5 of lower part 4A of the coupling portion. The upper end of the lower part 4A of the coupling portion is welded (weld 29C) and installed to the entire periphery of the upper part 4B of the coupling portion in this form. The upper part 4B of the coupling portion is a cover member for the upper part of coolant ascending path 13 and coolant descending path 14. Upper end plug 6 is welded and installed to the upper part 4B of the coupling portion.

After inserting descending tube 5 in the penetrating hole of the lower part 4A of the coupling portion, as mentioned above, the upper end of descending tube 5 is installed in the lower part 4A of the coupling portion through weld 29C. So, the entire periphery of descending tube 5 can be welded to the lower part 4A of the coupling portion easily. Even if a width of the gap formed between the large diameter tube portion 3A and descending tube 5 are narrow, welding of the entire periphery of descending tube 5 to lower part of the connecting portion 4A can be welded easily.

In the plural places of axial direction, descending tube 5 (about 5 mm outside diameter) is supported to large diameter tube portion 3A of ascending tube 3 by the supporting member (not illustrated). Small gap is formed between descending tube 5 and large diameter tube portion 3A. Descending tube 5a also is supported likewise to large diameter tube portion 3A of ascending tube 3a.

Two water rods 1 of fuel assembly 16 are arranged like two water rods 1A of fuel assembly 16A (refer to FIG. 3). Moreover, in fuel assembly 16, the total sectional area of penetrating holes 30A disposed in fuel supporting portion 12 is set to be static water head corresponding to the difference of the level of the upper end of coolant ascending path 13 and the level of coolant outlet port 15 likewise with fuel assembly 16A. The total cross-sectional area of all penetrating holes 30A provided in fuel supporting portion 12 is smaller than the cross-sectional area of cooling water passage 23.

In this example, similar to example 2, the total cross sectional area of water rod 1a and of coolant descending path 14 in descending tube 15 of water rod 1 is smaller than ½s of that of the coolant ascending path (in the large diameter portion) in ascending tube 3. Therefore, the boiling water reactor with the core loaded with fuel assembly 16 of this example can be operated in the similar way to the example of FIG. 2, by adjusting the cooling water flow rate that is supplied to the core.

When a quantity of cooling water that is supplied to fuel assembly 16 is changed, the cooling water flow in water rod 1 changes as shown in FIGS. 4A, 4B and 4C likewise with the example of FIG. 2.

Part of cooling water supplied in space 22 of lower tie-plate 19 of fuel assembly 16 flows in coolant path 23 via penetrating hole 30A provided in fuel supporting portion 12 likewise with fuel assembly 16A. This cooling water cools fuel rod 17. The remaining cooling water flows in coolant ascending path 13 of water rod 1 through opening 33 and coolant inlet port 9. The cooling water introduced into passage 2A which is a part of coolant ascending path 13 arrives at large diameter tube portion 3A through opening 10, smaller diameter tube portion 3B and taper part 3C.

When a amount of cooling water flow rates to be supplied in fuel assembly 16 is not enough, the cooling water that exists in coolant ascending path 13, especially in large diameter tube portion 3A evaporates to become steam. The steam is discharged in coolant path 23 from coolant outlet port 15 via passage 24 and coolant descending path 14. At this time, as shown in FIG. 4A, a steam area is formed in coolant ascending path 13. The liquid level is formed in coolant ascending path 13. The liquid level in the coolant ascending path 13 raises with the increase of water supply flow rate.

At last, it reaches the condition of FIG. 4C via the condition of FIG. 4B. That is the condition that the entire of coolant ascending path 13 and coolant descending path 14 are filled with cooling water. As a result, the effect of the spectral shift operation is improved, and the period of one fuel cycle is greatly extended.

The ascending tube 3 and descending tube 5 are set so as to form the opposite letter U. Since the gap exists between ascending tube 3 and descending tube 5 mentioned above, the peripheries of ascending tube 3 and descending tube 5 are cooled by the cooling water that rises in cooling water passage 23. According to this example, the temperature of ascending tube 3 and descending tube 5 can also be kept low likewise with fuel assembly 16A.

The following effects are arisen from this example.

One coolant inlet port of the water rod shown to FIG. 7A of EP-A-0282600 is provided at the lower end of the coolant ascending path. Therefore, there is a possibility that the coolant inlet port is clogged by solid substances such as the cladding that flows with cooling water. The smaller the diameter of the coolant inlet port is, the bigger the probability is. In this example, cooling water entrances 9 are provided in the surrounding direction of lower end plug 2 in such a manner that they are right-angled to the axial direction of the coolant ascending path. Therefore, the cooling water that flows into cooling water entrance 9 must bend to the right angle just before flowing into cooling water entrances 9. Therefore, the probability that plural cooling water entrances 9 are being clogged by cladding, etc. becomes remarkably low compared with the water rod shown in FIG. 7A of EP-A-0282600. In addition, cooling water entrance 9 is not provided in the axial direction of lower end plug 2, so the influence of the dynamic pressure by the flow of coolant in the core becomes small. As a result, the fluctuation of the liquid level in the water rod by the fluctuation of the dynamic pressure is suppressed remarkably.

As mentioned above, in the period of the fuel cycle, the steam area is formed in coolant ascending path 13, therefore, it is thought that the cooling water that exists in coolant ascending path 13 is concentrated, and cladding in the cooling water condenses and stagnates. Opening 10 is provided sideways and positioned at the higher part than the base of the passage that is formed in smaller diameter tube portion 3B so that opening 10 is not clogged by cladding that stagnates. The stagnated cladding is accumulated gradually in clad reservoir 11 formed between smaller diameter tube portion 3B and projection portion 2B. The capacity of clad reservoir 11 is decided by the estimated cladding quantity that is accumulating in the lifetime of fuel assembly 16.

What is claimed is:

1. A fuel assembly comprising:

a lower tie plate having fuel supporting portion at the top thereof;

a plurality of fuel rods each supported by said fuel supporting portion at the lower end thereof;

a plurality of water rods arranged between said fuel rods, wherein said fuel supporting portion has a second coolant passage for guiding coolant to a first passage formed between said fuel rods at a higher position than said fuel supporting portion, wherein said water rods each comprises a ascending path having a coolant ascending passage therein, said passage having a coolant entrance port opened at an area lower than said fuel supporting portion, and a descending path having a coolant descending passage therein, said coolant descending passage having a coolant exit for guiding the coolant that has arisen in said coolant ascending path downwardly and for discharging the coolant to said second coolant path, and wherein a ratio of a cross-sectional area at a part of the smallest cross-sectional area in said coolant ascending path to the largest on the downstream side in the axial direction of said coolant ascending path is set to be the range of 0.2–20%.

2. The fuel assembly as defined in claim 1, wherein the smallest part of said cross-sectional area is the coolant inlet port of said coolant ascending path.

3. The fuel assembly as defined in claim 1, wherein a pipe of one of said ascending path and said descending path is inserted into a connecting member and the upper end of said pipe is welded to said connecting member, and wherein a the other pipe is welded to the lower part of said connecting member, a cover member being installed between said connecting member to form a passage for communicating said coolant ascending path and said coolant descending path.

4. The fuel assembly as defined in claim 1, wherein a pipe-form part projecting upwardly and partitioning said coolant ascending passage in said coolant path is disposed in said ascending passage of said coolant ascending path, and wherein said coolant ascending path at a position upstream of said pipe-form part and said coolant descending path at a position downstream of said pipe-form part are communicated through an opening formed in a side wall of said pipe-form part.

5. The fuel assembly as defined in claim 1, wherein said fuel assembly has two water rods, and the largest cross-sectional area parts of said fuel rods adjoin the area where seven fuel rods can be located, and wherein each of said descending path of said water rods is arranged between said adjoining fuel rods that oppose to said ascending path.

6. The fuel assembly as defined in claim 5, wherein the descending path of one water rod and the descending path of another water rod are arranged in the reverse direction each other in the diagonal direction of the fuel assembly.

7. The fuel assembly as defined in claim 5, wherein one of the pipes of said ascending path is inserted into a connecting member and the top end of said pipe is welded to said connecting member, and wherein the other pipe is welded to the lower end of said connecting member, a cover member being installed between said connecting members to form a passage for communicating said coolant ascending path and said coolant descending path.

8. A fuel assembly comprising:

a lower tie plate having fuel supporting portion at the top thereof;

a plurality of fuel rods each supported by said fuel supporting portion at the lower end thereof;

a plurality of water rods arranged between said fuel rods, wherein said fuel supporting portion has a second coolant passage for guiding coolant to a first passage formed between said fuel rods at a higher position than said fuel supporting portion, wherein said water rods each comprises a ascending path having a coolant ascending passage therein and a descending passage disposed periphery of said ascending path therein, said passage guiding coolant supplied through a coolant entrance from the area lower than said fuel supporting portion upwardly, and said descending passage guiding downwardly coolant guided by said coolant ascending path to a coolant exit for discharging coolant to an area lower than said fuel supporting portion, and wherein a ratio of a cross-sectional area at a part of the smallest cross-sectional area in said coolant ascending path to the largest on the downstream side in the axial direction of said coolant ascending path is set to be the range of 0.2–20%.

9. The fuel assembly as defined in claim 8, wherein said coolant inlet port is the smallest part of the cross-sectional area.

10. The fuel assembly as defined in claim 8, wherein said coolant inlet port is provided in the side wall of said ascending path.

11. The fuel assembly as defined in claim 8, wherein the cross-sectional area of said coolant descending path is smaller than that of said coolant ascending path.

12. The fuel assembly as defined in claim 10, wherein the cross-sectional area of said coolant descending path is smaller than that of said coolant ascending path.

13. The fuel assembly as defined in claim 8, wherein the pipe-form part projecting upwardly that partitions said coolant ascending path is disposed in said coolant ascending path, and the upper part of said coolant ascending path is communicated with the lower part of said coolant ascending path than said pipe-form part through an opening formed in the side wall of said pipe-form part.

14. The fuel assembly as defined in claim 8, wherein a pipe of one of said ascending path and said descending path is inserted into a connecting member and the upper end of said pipe is welded to said connecting member, and wherein a the other pipe is welded to the lower part of said connecting member, a cover member being installed between said connecting member to form a passage for communicating said coolant ascending path and said coolant descending path.

15. The fuel assembly as defined in claim 8, wherein a pipe-form part projecting upwardly and partitioning said coolant ascending passage in said coolant path is disposed in said ascending passage of said coolant ascending path, and wherein said coolant ascending path at a position upstream of said pipe-form part and said coolant descending path at a position downstream of said pipe-form part are communicated through an opening formed in a side wall of said pipe-form part.

16. The fuel assembly as defined in claim 8, wherein said fuel assembly has two water rods, and the largest cross-sectional area parts of said fuel rods adjoin the area where seven fuel rods can be located, and wherein each of said descending path of said water rods is arranged between said adjoining fuel rods that oppose to said ascending path.

17. The fuel assembly as defined in claim 16, wherein a pipe of one of said ascending path and said descending path is inserted into a connecting member and the upper end of said pipe is welded to said connecting member, and wherein a the other pipe is welded to the lower part of said connecting member, a cover member being installed between said connecting member to form a passage for communicating said coolant ascending path and said coolant descending path.

18. The fuel assembly as defined in claim 16, wherein a pipe of one of said ascending path and said descending path is inserted into a connecting member and the upper end of said pipe is welded to said connecting member, and wherein a the other pipe is welded to the lower part of said connecting member, a cover member being installed between said connecting member to form a passage for communicating said coolant ascending path and said coolant descending path.

* * * * *

UNITED STATES PATENT AND TRADEMARK OFFICE
CERTIFICATE OF CORRECTION

PATENT NO. : 5,528,641
DATED : June 18, 1996
INVENTOR(S) : K. TAKEUCHI et al

It is certified that error appears in the above-indentified patent and that said Letters Patent is hereby corrected as shown below:

Column 1, line 8, change "the" to --a--;
    line 10, change "prior" to --Related--;
    line 11, delete "the";
    line 12, change "the" to --a--;
    line 15, after "absorbing" insert --a--; and
    line 50, delete "a" (second occurrence).

Column 2, line 9, change "are" to --is--;
    line 21, delete "com-";
    line 22, change "pensate" to --compensate for--;
    line 25, change "that occurs by" to --of--;
    line 27, change "occured by" to --of--;
    line 33, delete "level of the";
    line 57, after "is", insert --a--;
    line 61, after "showing", insert --an--; and
    line 64, after "shows", insert --the--.

Column 3, line 1, after "shows", insert --the--;
    line 4, after "during", insert --a--;
    line 6, change "examples" to --example--;
    line 15, after "showing", insert --the--;
    line 20, after "generation", insert --of a--;
    line 23, change "Embodiments;" to --Embodiments--;
    line 35, change "rod" to --rods--;
    line 37, change "rod" to --rods--;
    line 39, after "of"(first occurrence), insert --the--;
    line 41, change "rod" to --rods-- (both occurrences);
    line 44, after "and", insert --the--, and change "rod" to --rods--;
    line 45, change "Water" to --Each water--;
    line 46, change "rod" to --rods--, and change "1" to --1A--,
        and change "is" to --are--; and

UNITED STATES PATENT AND TRADEMARK OFFICE
CERTIFICATE OF CORRECTION

PATENT NO. : 5,528,641
DATED : June 18, 1996
INVENTOR(S) : K. TAKEUCHI et al

Page 2 of 8

It is certified that error appears in the above-indentified patent and that said Letters Patent is hereby corrected as shown below:

line 49, change "3A" to --3E--.

Column 4, line 2, change "19.6mm2" to --19.6mm$^2$--;
    line 7, delete "it"; and
    line 8, after "cates", insert --with--;
    line 12, after "among", insert --the--, and change "rods" to --rod--;
    line 13, change "of which" to --which have--;
    line 14, change "length is" to --lengths--;
    line 21, after "of", insert --the--;
    line 22, change "each" to --the--;
    line 24, change "adjoins" to --adjoin--;
    line 34, change "opposite" to --an upside-down--;
    line 41, change "rod" to --rods--, and delete "having coolant";
    line 42, delete "ascending path 13 and coolant descending path 14 therein";
    line 43, after "changed,", insert --the--;
    line 52, delete "in";
    line 53, delete "the upper", and change "part than" to --above--; and
    line 64, change "3A" to --3A,--.

Column 5, line 8, after "condition", insert --of being--;
    line 14, change "of" (second occurrence) to --during--;
    line 23, change "the opposite" to --an upside-down--;
    line 25, change "all" to --the entire--;
    line 50, delete "part"; and
    line 53, change "Average" to --The average--.

Column 6, line 7, change "was" to --has been--;
    line 9, before "circulation", insert --the--;
    line 14, delete "Rising", and change "the" to --The--;
    line 15, change "performed" to --increased--, and delete "of increase";

UNITED STATES PATENT AND TRADEMARK OFFICE
CERTIFICATE OF CORRECTION

PATENT NO. : 5,528,641  Page 3 of 8
DATED : June 18, 1996
INVENTOR(S) : K. TAKEUCHI et al It is certified that error appears in the above-indentified patent and that said Letters Patent is hereby corrected as shown below:

line 16, change "damages" to --damage--;
    line 29, change "generation" to --generated--;
    line 37, change "tube" to --tubes--, and change "is" to --are--;
    line 38, after "direction", insert --with respect--;
    line 51, change "variously changed" to --varied--;
    line 56, after "cross-sectional", insert --area--;
    line 63, delete "the" (first occurrence); and
    line 66, after "shows", insert --the--.

Column 7, line 35, after "of", insert --the--;
    line 42, change "in the" to --per--;
    line 44, delete "flow in coolant";
    line 45, delete "ascending path 13";
    line 49, change "12" to --12A--; and
    line 56, after "formed", insert --in--.

Column 8, line 21, after "9A", insert --greatly--, and delete "much on";
    line 24, change "occured by" to --of--;
    line 28, change "neutron is" to --neutrons are--;
    line 29, before "fission", insert --the--;
    line 34, change "that is occured by" to --of--;
    line 35, delete "that is";
    line 36, change "occured by" to --due to--;
    line 48, after "shows", insert --a graph of--;
    line 49, after "of", insert --the--;
    line 58, change "are" to --is--; and
    line 66, after "of", insert --the--.

Column 9, line 4, after "to", insert --a--;
    line 10, after "of", insert --the--, and change "such the" to --this--;

UNITED STATES PATENT AND TRADEMARK OFFICE
CERTIFICATE OF CORRECTION

PATENT NO. : 5,528,641
DATED : June 18, 1996
INVENTOR(S) : K. TAKEUCHI et al

Page 4 of 8

Figure 10:
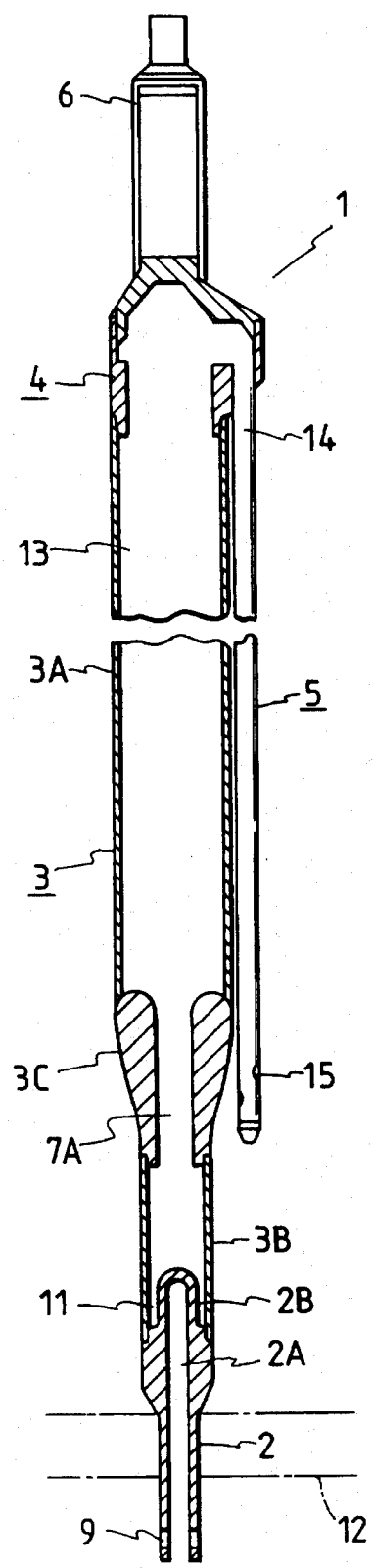
FIG. 10 is a longitudinal section view of the water rod in FIG. 9.

It is certified that error appears in the above-indentified patent and that said Letters Patent is hereby corrected as shown below:

line 25, change "rod" to --rods--(both occurrences);
    line 26, change "spacer" to --spacers--, and change "rod" to --rods--;
    line 30, change "rod" to --rods--;
    line 32, change "rod" to --rods--;
    line 36, change "rod" to --rods--;
    line 37, change "rod" to --rods--;
    line 38, change "Water" to --As shown in Fig. 10, each water--;
    line 40, change "Water" to --A water--, and change "the" to --a--;
    line 43, change "3C" to --3C,--;
    line 45, change "7" to --7A--;
    line 46, delete "it", and after "forms", insert --a--;
    line 66, change "with smaller diameter" to --within--; and
    line 67, delete "therein".

Column 10, line 8, delete "on the", and "of";
    line 22, delete "of manu";
    line 23, change "facturing time" to --at manufacture--;
    line 24, change "has" to --have a--;
    line 31, change "the lower" to --a--, and after "part", insert --lower--;
    line 34, delete "is" (second occurrence);
    line 35, after "in", insert --the--;
    line 39, delete "it";
    line 61, change "the opposite" to --an upside-down--; and
    line 62, after "U", insert --as--.

Column 11, line 15, change "At" to --Finally,--, and delete "last,";
    line 35, after "to", insert --the--;
    line 40, change "Small" to --A small--;
    line 43, change "3a" to --3--;
    line 48, after "be", insert --the--; and
    line 61, change "the" (first occurrence) to --a--.

UNITED STATES PATENT AND TRADEMARK OFFICE
CERTIFICATE OF CORRECTION

PATENT NO. : 5,528,641
DATED : June 18, 1996
INVENTOR(S) : K. TAKEUCHI et al

It is certified that error appears in the above-indentified patent and that said Letters Patent is hereby corrected as shown below:

Column 12, line 1, after "of" (first occurrence), insert --the--;
    line 5, change "rod" to --rods--;
    line 11, change "a" to --the--;
    line 20, change "raises" to --rises--;
    line 23, change "4B. That" to --4B (that--;
    line 25, change "water." to --water).--;
    line 29, change "the opposite" to --an upside-down--;
    line 36, change "are arisen" to --arise--;
    line 37, change "to" to --in--;
    line 42, delete "is";
    line 43, delete "is";
    line 49, delete "Therefore,", and change "the" to --The--;
    line 50, after "etc.", insert --thus--; and
    line 62, change "13," to --13;--.

IN THE ABSTRACT

A fuel assembly is provided with a coolant ascending path for making coolant rise, and a water rod having a coolant descending path for conducting the coolant.
    A ratio of the minimum flow area of the coolant ascending path 13 to the maximum flow area of the coolant ascending path 13 is set to be 0.2 - 20%.
    In the normal operation, the declination degree from the liquid level in the coolant ascending path, corresponding to the coolant flow rate of the liquid level formed in the coolant ascending path, can be controlled. Further, at the time of the excess the change speed of the liquid level can also be controlled.

UNITED STATES PATENT AND TRADEMARK OFFICE
CERTIFICATE OF CORRECTION

PATENT NO. : 5,528,641
DATED : June 18, 1996
INVENTOR(S) : K. TAKEUCHI et al

Page 6 of 8

It is certified that error appears in the above-indentified patent and that said Letters Patent is hereby corrected as shown below:

IN THE CLAIMS

Column 13, Claim 1, line 7, after "having" insert --a--;
    line 10, after "thereof;" insert --and--;
    line 11, change "," to --;--;
    line 13, after "first" insert --coolant--;
    line 16, change "comprises" to --comprise--, and after "a" insert --coolant--;
    line 17, after "said" insert --coolant ascending--;
    line 18, change "entrance" to --inlet--;
    line 19, after "a" insert --coolant--;
    line 24, change "path" to --passage--; and
    line 27, after "be" insert --in--.

Claim 3, line 33, after "said" (both occurrences) insert --coolant--;
    line 35, delete "a";
    line 37, change "between" to --across--;and
    line 39, change "and" to --with--.

Claim 5, line 53, after "said" insert --coolant--;
    line 54, change "path" to --paths--; and
    line 55, delete "to", and after "said" insert --coolant--.

Claim 6, line 57, before "descending" (both occurrences) insert --coolant--; and
    line 58, change "the reverse direction" to --reverse directions with respect to--.

Claim 7, line 61, after "said" insert --coolant--;
    line 65, change "between" to --across--, and change "members" to --member--; and
    line 67, change "and" to --with--.

UNITED STATES PATENT AND TRADEMARK OFFICE
CERTIFICATE OF CORRECTION

PATENT NO. : 5,528,641
DATED : June 18, 1996
INVENTOR(S) : K. TAKEUCHI et al

It is certified that error appears in the above-indentified patent and that said Letters Patent is hereby corrected as shown below:

Column 14, Claim 8, line 2, after "having" insert --a--;
    line 5, after "thereof;" insert --and--;
    line 6, change "," to --;--;
    line 11, change "comprises a" to --comprise a coolant--;
    line 13, before "descending" insert --coolant--, and change "passage disposed periphery of said" to --path disposed peripheral to said coolant--;
    line 14, after "said" insert --coolant ascending--;
    line 15, change "entrance" to --inlet port--;
    line 16, after "said" insert --coolant--;
    line 17, change "passage" to --path--; and
    line 23, after "be" insert --in--.

Claim 10, line 30, before "ascending" insert --coolant--.

Claim 13, line 37, change "wherein the" to --further comprising a--;
    line 39, after "path" insert --and that--;
    line 40, change "and" to --wherein--, and delete "is";
    line 41, change "communicated" to --communicates--; and
    line 42, change "than" to --with respect to--.

Claim 14, line 45, after "said" (both occurrences) insert --coolant--;
    line 48, delete "a";
    line 49, change "between" to --across--; and
    line 51, change "and" to --with--.

Claim 15, line 55, after "coolant" (second occurrence) insert --ascending--;
    line 56, after "said" (first occurrence) insert --coolant--;
    line 59, delete "are"; and
    line 60, change "cated" to --cate--.

UNITED STATES PATENT AND TRADEMARK OFFICE
CERTIFICATE OF CORRECTION

PATENT NO. : 5,528,641
DATED : June 18, 1996
INVENTOR(S) : K. TAKEUCHI et al

It is certified that error appears in the above-indentified patent and that said Letters Patent is hereby corrected as shown below:

Claim 16, line 66, before "descending" insert --coolant--, and change "path" to --paths--; and
    line 67, delete "to", and after "said" insert --coolant--.

Col. 15, Claim 17, line 2, after "said" (both occurrences) insert --coolant--;
    line 4, delete "a";
    line 5, change "between" to --across--; and
    line 7, change "and" to --with--.

Signed and Sealed this

Third Day of February, 1998

Attest:

BRUCE LEHMAN

Attesting Officer     Commissioner of Patents and Trademarks